United States Patent [19]
McKernon et al.

[11] Patent Number: 4,718,148
[45] Date of Patent: Jan. 12, 1988

[54] CLAMPING MEANS FOR A STRAP

[75] Inventors: David A. McKernon, Littlehampton; Douglas J. Cunningham, Hants, both of England

[73] Assignee: Britax (Wingard) Ltd., Chichester, England

[21] Appl. No.: 916,167

[22] Filed: Oct. 7, 1986

[30] Foreign Application Priority Data

Oct. 9, 1985 [GB] United Kingdom ............... 8524916

[51] Int. Cl.⁴ .............................................. A44B 11/12
[52] U.S. Cl. ...................... 24/170; 24/68 CD; 24/191; 242/107.2; 280/806; 280/808; 297/476
[58] Field of Search ............ 24/170, 71 SB, 193, 24/71 TD, 191, 69 ST, 68 SB, 68 CD, 71 CT, 68 A, 69 SB; 280/806, 808; 297/476; 242/107.2

[56] References Cited

U.S. PATENT DOCUMENTS

| | | | |
|---|---|---|---|
| 1,473,581 | 11/1923 | Kerngood | 24/191 |
| 2,554,542 | 5/1951 | Rust et al. | 24/71 TD X |
| 3,227,489 | 1/1966 | Stubblefield | 242/107.2 |
| 3,574,246 | 4/1971 | Norton et al. | 24/68 CD |
| 3,719,972 | 3/1973 | Klink | 24/170 X |
| 4,103,380 | 8/1978 | Richmond | 24/68 CD X |
| 4,464,811 | 8/1984 | Holmes | 24/193 X |
| 4,549,770 | 10/1985 | Kurtti | 24/170 X |

FOREIGN PATENT DOCUMENTS

| | | | |
|---|---|---|---|
| 0061825 | 10/1982 | European Pat. Off. | |
| 0147059 | 7/1985 | European Pat. Off. | |
| 1097178 | 12/1967 | United Kingdom | 297/476 |

Primary Examiner—Kenneth J. Dorner
Assistant Examiner—Laurie K. Cranmer
Attorney, Agent, or Firm—Hayes, Davis & Soloway

[57] ABSTRACT

Clamping means for a strap, adapted to be located between a strap storage location and a strap utilization location, comprises reaction member pivotally mounted on a base member for angular movement about a first axis, a guide member pivotally mounted on a support member fast with the reaction member for angular movement about a second axis positioned between the reaction member and the first pivot axis. Resilient means retains the guide member and the reaction member in respective rest positions in which the strap is freely movable between the guide member and reaction member until the tension applied to the strap exceeds a predetermined level. When the tension in the strap exceeds said predetermined level, angular movement of the guide member causes corresponding angular movement of the reaction member, thereby wrapping the strap round both the reaction member and the guide member so that one layer of the strap is clamped against the reaction member by another layer of the strap.

3 Claims, 5 Drawing Figures

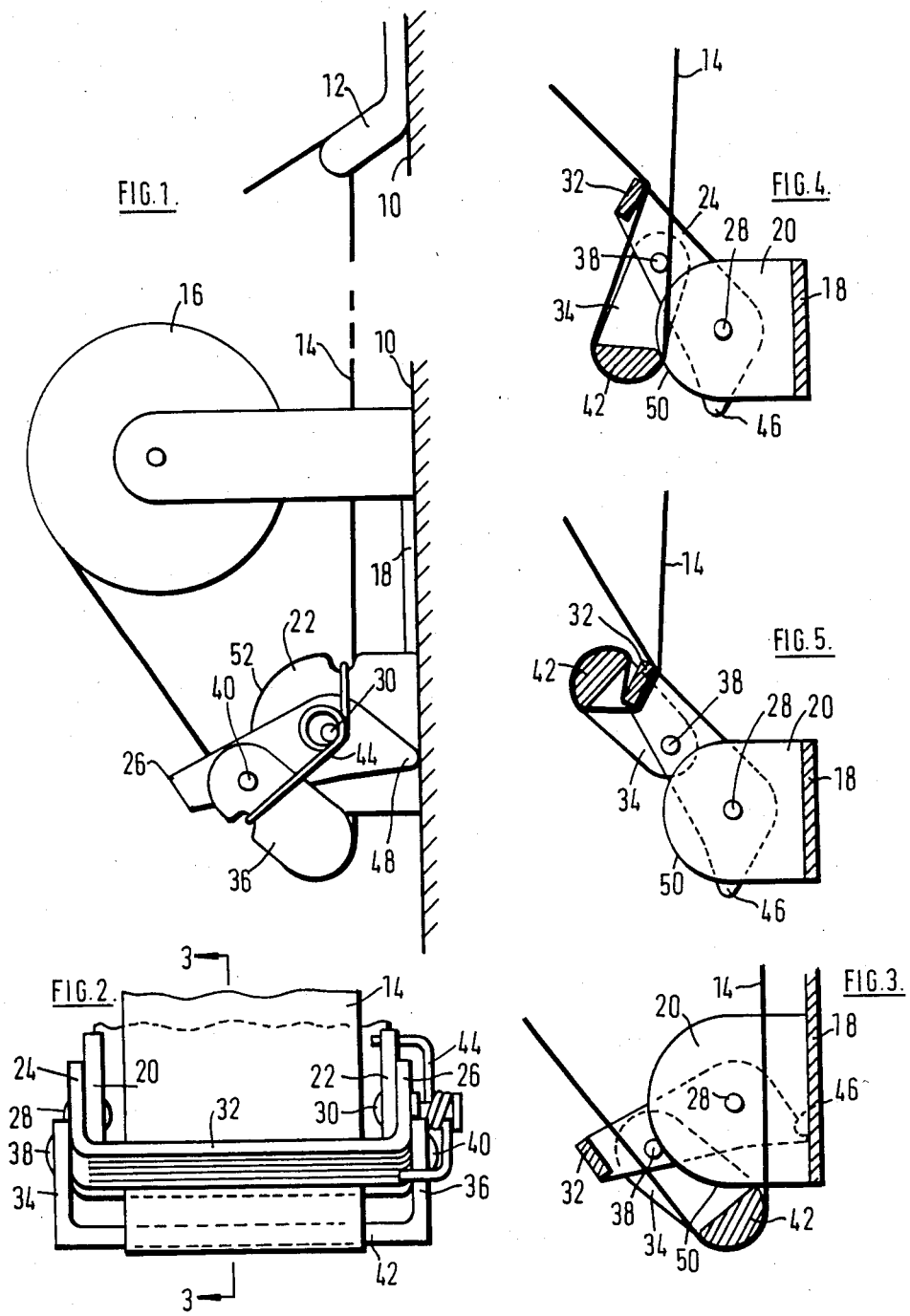

CLAMPING MEANS FOR A STRAP

This invention relates to clamping means for a strap and has particular application to the provision of clamping means for a vehicle safety belt system incorporating an emergency locking retractor.

Locking mechanisms for safety belt retractors commonly operate to lock the spindle of the retractor. With this arrangement, it is usual to find that an undesirably large length of strap is paid out after the spindle has locked, due to tightening of the coils of strap wound on the spindle. In addition, it is necessary for the retractor to be strong enough to take the maximum load which might be imposed on the strap during an accident.

Patent Specification No. EP-A-0147059 discloses clamping means for a strap which is adapted to be located between a strap storage location and a strap utilisation location and which comprises a reaction member secured to a first support member which is pivotally mounted on a base member for angular movement about a first axis, a guide member secured to a second support member which is mounted for angular movement about a second axis, retention means for retaining the guide member and the reaction member in respective rest positions in which the strap is freely movable between the guide member and reaction member until the tension applied to the strap exceeds a predetermined level, the reaction member and the guide member being so interconnected that, when the tension in the strap exceeds said predetermined level, angular movement of the guide member causes corresponding angular movement of the reaction member, thereby wrapping the strap round both the reaction member and the guide member so that one layer of the strap is clamped against the reaction member by another layer of the strap.

The present invention aims to provide clamping means of this type in which the extent to which the strap is wrapped around the reaction member and the guide member is increased, thereby reducing extent to which an imposed load can cause the strap to slip through the clamping means.

According to the invention, in clamping means of this type, the second support member is pivotally mounted on the first support member with the second pivot axis positioned between the reaction member and the first pivot axis, the distance of the guide member from the second pivot axis is greater than the distance of the reaction member from the second pivot axis, and said rest position of the guide member is on the opposite side of the first support member to both the strap storage location and the strap utilisation location and is defined by stop means which prevent movement of the guide member therefrom towards the first pivot axis, so that the resultant force exerted on the guide member by tension in the strap is directed between the first and second pivot axes when the guide member and support member are both in their rest positions and tension in the strap exceeding said predetermined level causes angular movement of the first support member to an orientation in which said resultant force is directed on the opposite side of the second pivot axis to the first pivot axis.

The retention means may comprise resilient means arranged to bias the first support member into its rest position. Preferably, the second support member is also resiliently biased into its rest position, thereby ensuring that both support members return to their rest positions when tension in the strap is reduced sufficiently.

An embodiment of the invention will now be described, by way of example, with reference to the accompanying drawings, in which:

FIG. 1 is a side elevational view of clamping means in accordance with the invention, together with an associated retractor and shoulder anchorage, with the strap in its position of normal use;

FIG. 2 is a front elevational view of the clamping means shown in FIG. 1;

FIG. 3 is a cross-sectional view, on the line 3—3 in FIG. 2;

FIG. 4 is a cross-sectional view, on the line 3—3 in FIG. 2, but with the clamping means in an intermediate position; and FIG. 5 is a cross-sectional view, on the line 3—3 in FIG. 2, but with the clamping means in its fully locked position.

FIG. 1 shows the B-post 10 of a motor vehicle having a conventional shoulder anchorage 12 through which the shoulder strap 14 of a safety belt passes on its way to an emergency locking retractor 16 having a base member 18 which is mounted on the B-post 10 adjacent to the bottom thereof.

As can be seen from FIGS. 1 to 3, a pair of side limbs 20 and 22 project from the base member 18 below the retractor 16. Each side limb 20, 22 has a respective support arm 24, 26 pivotally mounted thereon for angular movement about a generally horizontal axis defined by respective pivot pins 28 and 30. The free ends of the arms 24 and 26 are interconnected by a reaction member 32.

A second pair of support arms 34 and 36 are pivotally mounted, by respective coaxial pivot pins 38 and 40 on the support arms 24 and 26 respectively at intermediate positions between the first mentioned pivot axis and the reaction member 32. A guide member 42 is mounted on the free ends of the support arms 34 and 36 which are of sufficient length to allow the guide member 42 to pivot round the end of the first support arms 24 and 26. The strap 14 passes round the guide member 42 between the shoulder anchorage 12 and the retractor 16. A spring 44 biases the guide member 42 in the anti-clockwise direction as viewed in FIG. 1, into the position illustrated, so that respective heels 46 and 48 on the levers 24 and 26 engage with the base member and the guide member 42 engages with semicircular edges 50 and 52 of the side limbs 20 and 22.

In use, the strap 14 passes down from the shoulder anchorage 12, between the B-post 10 and the guide member 42, round the bottom of the guide member 42 and thence between the guide member 42 and the reaction member 32 to the retractor 16. The heels 46 and 48 and the semicircular edges 50 and 52 are positioned so that the strap 14 does not touch the reaction member 32 at this stage. The strength of the spring 44 is such that normal tension in the strap 14 as it is withdrawn from the retractor 16 is insufficient to cause angular movement of the first support arms 24 and 26 in the clockwise direction.

If the emergency locking retractor 16 actuates to prevent protraction of the strap 14 therefrom, any tension in the strap 14 sufficient to overcome the spring 44 will cause the first support levers 24 and 26 to pivot in the clockwise direction, the guide member 42 initially remaining in contact with the edges 50 and 52. If the tension is sufficient, the arms 24 and 26 move to the position illustrated in FIG. 4 in which the resultant of the forces exerted by the two ends of the strap 14 on the guide member 42 intersects the pivot axis defined by the pins 38 and 40. Any further movement of the arms 24 and 26 causes the arms 34 and 36 to go over-centre to the position illustrated in FIG. 5 in which the two parts of the strap 14 on each side of the guide member 42 are in face-to-face engagement with each other where they are wrapped round the reaction member 32, the outer layer clamping the inner layer against the reaction member 32. Further tension in the strap 14 is thus not passed to the retractor 16, thereby minimising the length of strap paid out as a result of bunching on the spool of the retractor 16.

When the tension in the strap 14 is sufficiently reduced, the spring 44 restores the mechanism to the position illustrated in FIG. 1.

As an alternative to mounting the clamping means in close proximity to the retractor 16, as in the embodiment illustrated, it may be incorporated into the shoulder anchorage 12.

We claim:

1. Clamping means comprising:
   a strap extending between a strap storage location and a strap utilisation location,
   a base structure,
   a first support member pivotally mounted on the base structure for angular movement about a first pivot axis,
   a reaction member secured to the first support member,
   a second support member pivotally mounted on the first support member for angular movement about a second pivot axis positioned between the reaction member and the first pivot axis,
   a guide member secured to the second support member,
   stop means, and
   retention means for retaining the guide member and the reaction member in respective rest positions in which the guide member is on the opposite side of the first support member to both the strap storage location and the strap utilisation location and is in engagement with said stop means which prevents movement of the guide member towards the first pivot axis, the strap being freely movable between the guide member and the reaction member;
   the distance of the guide member from the second pivot axis being greater than the distance of the reaction member from the second pivot axis, so that tension in the strap exerts a resultant force on the guide member, said resultant force being directed between the first and second pivot axes when the guide member and second support member are both in their rest positions, and tension in the strap exceeding a predetermined level causes angular movement of the first support member to an orientation in which said resultant force is directed on an opposite side of the second pivot axis to the first pivot axis, thereby wrapping the strap round both the reaction member and the guide member so that one layer of the strap is clamped against the reaction member by another layer of the strap.

2. Clamping means according to claim 1, wherein the retention means comprises resilient means arranged to bias the first support member into its rest position.

3. Clamping means according to claim 2, wherein the resilient means engages with the base structure and the second support member.

* * * * *